(12) United States Patent
Morska et al.

(10) Patent No.: US 11,667,395 B2
(45) Date of Patent: Jun. 6, 2023

(54) FLAT RELEASE MECHANISM FOR RAM AIR TURBINE ACTUATOR

(71) Applicant: HAMILTON SUNDSTRAND CORPORATION, Charlotte, NC (US)

(72) Inventors: Izabela Morska, Wroclaw (PL); Piotr Sobolak, Slupsk (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1093 days.

(21) Appl. No.: 16/242,327

(22) Filed: Jan. 8, 2019

(65) Prior Publication Data
US 2020/0216187 A1 Jul. 9, 2020

(51) Int. Cl.
*E05C 1/08* (2006.01)
*B64D 41/00* (2006.01)
*F03D 9/32* (2016.01)

(52) U.S. Cl.
CPC .............. *B64D 41/007* (2013.01); *E05C 1/08* (2013.01); *F03D 9/32* (2016.05); *F05B 2220/31* (2013.01); *Y10T 292/1021* (2015.04)

(58) Field of Classification Search
CPC ......... Y10T 292/0863; Y10T 292/0864; Y10T 292/0869; Y10T 292/0886; Y10T 292/0889; Y10T 292/0936; Y10T 292/0999; Y10T 292/1062; Y10T 292/1021; E05C 5/00; E05C 5/02; E05B 65/0864; B64D 41/007; F05B 2220/31
See application file for complete search history.

(56) References Cited

U.S. PATENT DOCUMENTS

| 643,612 A | 2/1900 | Thuestad |
| 983,647 A * | 2/1911 | Romines ............... E05C 19/105 |
| | | 292/124 |
| 1,103,798 A * | 7/1914 | McMahon .......... E05B 65/0864 |
| | | 292/341.17 |

(Continued)

FOREIGN PATENT DOCUMENTS

| DE | 484219 C | * 10/1929 | |
| DE | 4142531 A1 | * 6/1993 | ......... B62D 33/0222 |
| EP | 1529908 A2 | * 5/2005 | ............ B60J 7/1851 |

OTHER PUBLICATIONS

The Extended European Search Report For Application No. 19208289.9-1010; dated May 19, 2020; Report Received Date: May 5, 2020; 8 pages.

*Primary Examiner* — Carlos Lugo
(74) *Attorney, Agent, or Firm* — Cantor Colburn LLP

(57) ABSTRACT

A latch mechanism for use in a ram air turbine actuator including: a coupler housing extending from a first end to a second end opposite the first end, the coupler housing including: a base arm having an upper surface and a lower surface opposite the upper surface; a first wall extending away from the upper surface, the first wall including a first slot; and a second wall extending away from the upper surface, the second wall including a second slot, wherein the upper surface, the first wall, and the second wall at least partially enclose a cavity therebetween; a lock release pivot arm including: a first end; a second end opposite the first end of the lock release pivot arm; an orifice located proximate the second end of the lock release pivot arm; and a pivot pin located within the first slot, the second slot, and the orifice.

14 Claims, 4 Drawing Sheets

(56) References Cited

U.S. PATENT DOCUMENTS

| | | | | |
|---|---|---|---|---|
| 1,231,135 A * | 6/1917 | Dempsey | ............ | E05B 65/0864 |
| | | | | 292/153 |
| 1,249,176 A * | 12/1917 | Newman | ................... | E05C 5/00 |
| | | | | 292/67 |
| 1,492,088 A * | 4/1924 | Schmitz | .................. | E05B 63/12 |
| | | | | 292/65 |
| 2,186,795 A * | 1/1940 | Anderson | ................ | E05C 5/00 |
| | | | | 292/64 |
| 3,371,947 A * | 3/1968 | Gridley | ................ | E05B 63/127 |
| | | | | 292/108 |
| 3,820,823 A | 6/1974 | Beaston | | |
| 3,843,174 A * | 10/1974 | Bogunovich | ........... | E05B 83/02 |
| | | | | 292/144 |
| 5,997,053 A * | 12/1999 | Marquez | ................ | E05C 17/60 |
| | | | | 292/DIG. 20 |
| 6,523,867 B1 * | 2/2003 | Yeh | ........................ | E05F 5/027 |
| | | | | 292/63 |
| 7,441,812 B2 * | 10/2008 | Welsh | ................. | E05B 17/0025 |
| | | | | 292/DIG. 31 |
| 10,686,268 B2 * | 6/2020 | Wang | ................... | H05K 7/1405 |
| 2018/0368652 A1 * | 12/2018 | Krieger | ................ | E05C 19/009 |

\* cited by examiner

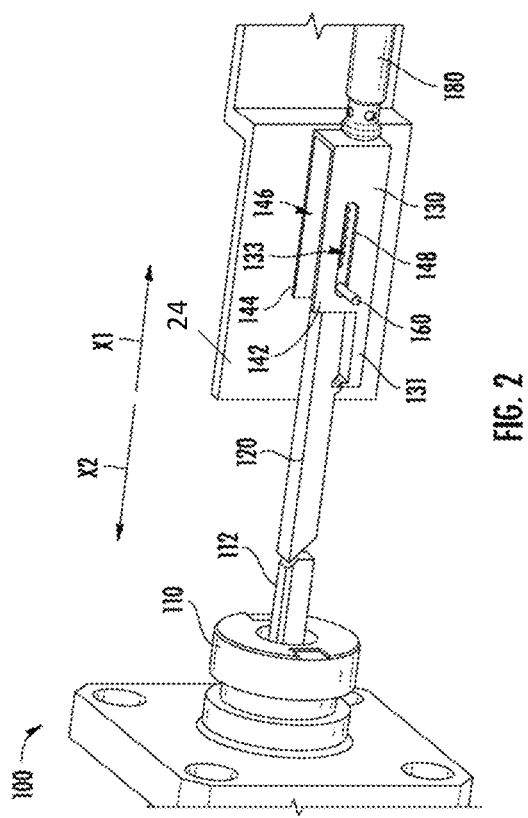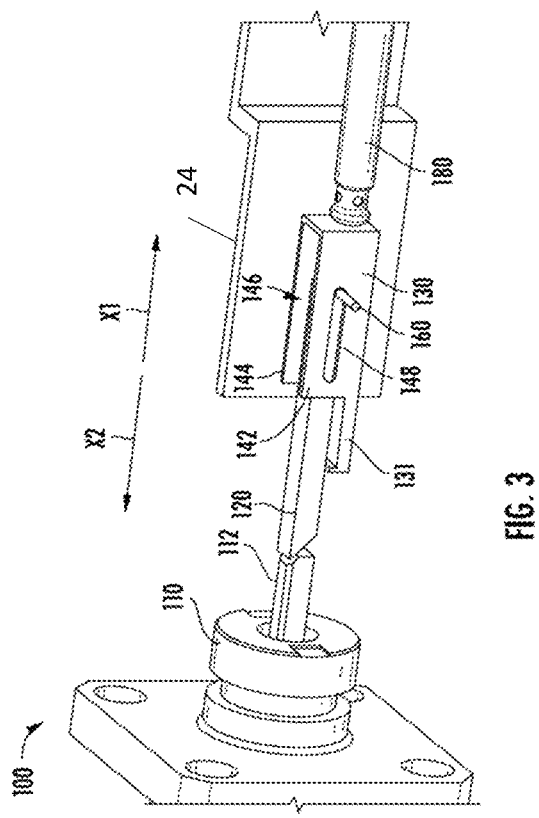

FLAT RELEASE MECHANISM FOR RAM AIR TURBINE ACTUATOR

BACKGROUND

The subject matter disclosed herein generally relates to ram air turbine actuators, and more specifically to a release mechanism employed in a ram air turbine actuator.

A Ram Air Turbine (RAT) is a device for generating emergency supplemental power utilized on numerous aircraft to provide hydraulic and electrical power. The RAT is stowed in the aircraft structure and deployed into the air stream by an actuator. The actuator is attached to aircraft structure and to an arm on the strut of the RAT. On deployment, the deployment actuator forces the RAT to swing out of its stowed, or retracted, position in the aircraft and into the air stream. The air stream acts on the RAT blades to spin the turbine and governor assembly, which in turn operates an electrical generator and hydraulic pump providing power to the aircraft. When not needed, the actuator stows the RAT within the aircraft, such as, for example when the aircraft is on the ground.

BRIEF SUMMARY

According to one embodiment, a latch mechanism for use in a ram air turbine actuator is provided. The latch mechanism including: a coupler housing extending from a first end to a second end opposite the first end, the coupler housing including: a base arm having an upper surface and a lower surface opposite the upper surface; a first wall extending away from the upper surface of the base arm, the first wall including a first slot; and a second wall extending away from the upper surface of the base arm, the second wall including a second slot, wherein the upper surface, the first wall, and the second wall at least partially enclose a cavity therebetween; a lock release pivot arm including: a first end; a second end opposite the first end of the lock release pivot arm; an orifice located proximate the second end of the lock release pivot arm; and a pivot pin located within the first slot, the second slot, and the orifice, the pivot pin operably connecting the lock release pivot arm and the coupler housing.

In addition to one or more of the features described above, or as an alternative, further embodiments may include: a rotational biasing mechanism operably connected to the coupler housing and the lock release pivot arm, wherein the rotational biasing mechanism maintains the lock release pivot arm in a neutral position.

In addition to one or more of the features described above, or as an alternative, further embodiments may include that the rotational biasing mechanism operably connects to the coupler housing and the lock release pivot arm proximate the pivot pin.

In addition to one or more of the features described above, or as an alternative, further embodiments may include that in the neutral position the lock release pivot arm is about parallel to the coupler housing.

In addition to one or more of the features described above, or as an alternative, further embodiments may include: a linear biasing mechanism operably connected to the second end of the lock release pivot arm and to the second end of the coupler housing.

In addition to one or more of the features described above, or as an alternative, further embodiments may include that the linear biasing mechanism is oriented about parallel with the first slot and the second slot.

In addition to one or more of the features described above, or as an alternative, further embodiments may include that the linear biasing mechanism is located within the cavity.

In addition to one or more of the features described above, or as an alternative, further embodiments may include that the second end of the lock release pivot arm is located within the cavity.

In addition to one or more of the features described above, or as an alternative, further embodiments may include that the first end of the lock release pivot arm is wedge shaped.

In addition to one or more of the features described above, or as an alternative, further embodiments may include: a solenoid having a solenoid plunger configured to impact the first end of the lock release pivot arm when the solenoid is activated.

In addition to one or more of the features described above, or as an alternative, further embodiments may include that the solenoid plunger rotates the lock release arm around the pivot pin through an angle of rotation from a neutral position to a raised rotated position when the solenoid is activated.

In addition to one or more of the features described above, or as an alternative, further embodiments may include that the lock release arm further includes a first notch located on a bottom surface of the lock release arm, the bottom surface being in a facing spaced relationship with the upper surface of the coupler housing, wherein the first notch is configured to interlock with the base arm of the coupler housing at a first point and a second point.

In addition to one or more of the features described above, or as an alternative, further embodiments may include that the base arm of the coupler housing further includes: a first notch located in the upper surface of the base arm, the first notch being configured to interlock with lock release arm at a first point on a bottom surface of the lock release arm; and a second notch located in the upper surface of the base arm, the second notch being configured to interlock with the release arm at the first point on the bottom surface of the lock release arm.

In addition to one or more of the features described above, or as an alternative, further embodiments may include that the lock release arm further includes a first notch located on a bottom surface of the lock release arm, the bottom surface being in a facing spaced relationship with the upper surface of the coupler housing, and wherein the base arm of the coupler housing further includes: a first notch located in the upper surface of the base arm and configured to interlock with the first notch of the lock release arm; and a second notch located in the upper surface of the base arm and configured to interlock with the first notch of the lock release arm.

In addition to one or more of the features described above, or as an alternative, further embodiments may include that the first notch of the base arm is located at the first end of the base coupler housing.

In addition to one or more of the features described above, or as an alternative, further embodiments may include that the second notch of the base arm is located interposed between the first end of the base coupler housing and the second end of the base coupler housing.

In addition to one or more of the features described above, or as an alternative, further embodiments may include: a lock bolt attached to the second end of the coupler housing.

According to another embodiment, an actuator for use in a ram air turbine actuator is provided. The actuator including: a hydraulic system for actuating a lock bolt; a latch mechanism to activate the actuator, the latch mechanism including: a coupler housing extending from a first end to a second end opposite the first end, the second end being attached to the lock bolt, wherein the coupler housing includes: a base arm having an upper surface and a lower surface opposite the upper surface; a first wall extending away from the upper surface of the base arm, the first wall including a first slot; and a second wall extending away from the upper surface of the base arm, the second wall including a second slot, wherein the upper surface, the first wall, and the second wall at least partially enclose a cavity therebetween; a lock release pivot arm including: a first end; a second end opposite the first end of the lock release pivot arm; an orifice located proximate the second end of the lock release pivot arm; and a pivot pin located within the first slot, the second slot, and the orifice, the pivot pin operably connecting the lock release pivot arm and the coupler housing.

In addition to one or more of the features described above, or as an alternative, further embodiments may include that the latch mechanism further includes: a rotational biasing mechanism operably connected to the coupler housing and the lock release pivot arm, wherein the rotational biasing mechanism maintains the lock release pivot arm in a neutral position.

In addition to one or more of the features described above, or as an alternative, further embodiments may include that the rotational biasing mechanism operably connects to the coupler housing and the lock release pivot arm proximate the pivot pin.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 2 is a perspective view of a latch mechanism in a locked position for use in the actuator of FIG. 1, according to an embodiment of the present disclosure;

FIG. 3 is a perspective view of a latch mechanism in an unlocked position for use in the actuator of FIG. 1, according to an embodiment of the present disclosure;

DETAILED DESCRIPTION

A detailed description of one or more embodiments of the disclosed apparatus and method are presented herein by way of exemplification and not limitation with reference to the Figures.

Figure 1:
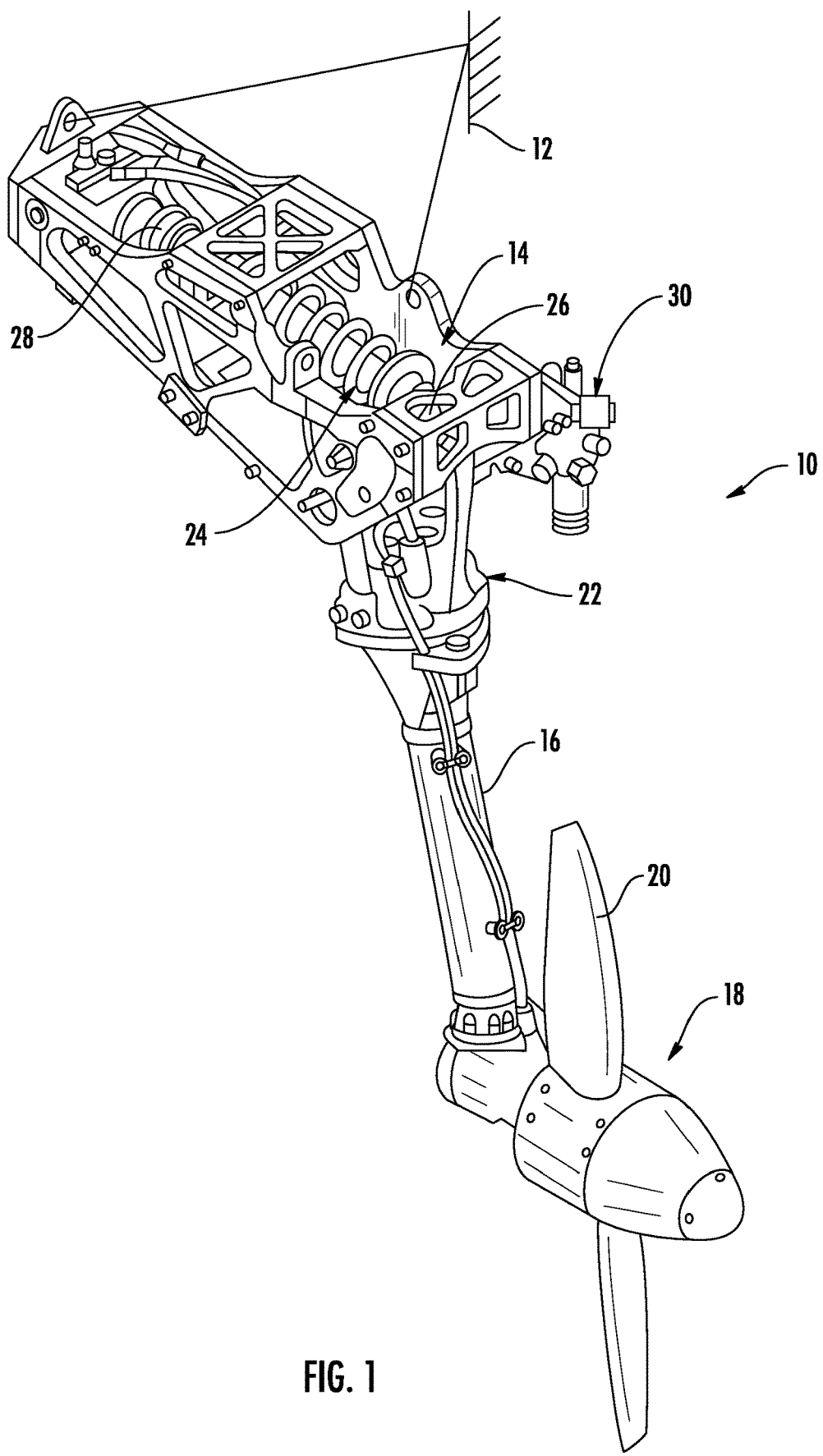
FIG. 1 is a perspective view of ram air turbine (RAT) assembly that may incorporate embodiments of the present disclosure.

Referring now to FIG. 1, a perspective view of a RAT system 10 in a deployed position is illustrated, according to an embodiment of the present disclosure. The RAT system 10 is secured to an aircraft structure 12 by a housing 14. The housing 14 pivotally supports the strut 16 having a turbine 18 at one end. The turbine 18 includes blades 20, which impart rotational drive to an electric generator 22 and a hydraulic pump 30. An actuator 24 is secured to a strut 16 at a first end 26 and to a housing 14 at a second end 28.

Referring now to FIGS. 2-5, various embodiments of the present disclosure are illustrated. A release latch mechanism 100 for the actuator 24 is illustrated in FIGS. 2-5. The latch mechanism 100 in operation moves from a first position (FIG. 2 and FIG. 4 at 100a) to second position (FIG. 3 and FIG. 4 at 100b) when the solenoid 110 is activated. The first position may be a locked position (FIG. 2 and FIG. 4 at 100a) where the actuator 24 is retracted and the second position may be an unlocked position (FIG. 3 and FIG. 4 at 100b) where the actuator 24 is extended to deploy the RAT system 10.

As shown in FIGS. 2-5, the release latch mechanism 100 includes a solenoid 110, a lock release pivot arm 120, a pivot pin 160, a coupler housing 130, and a lock bolt 180. The solenoid 110 includes a solenoid plunger 112 and a solenoid reset spring 114. The lock release pivot arm 120 includes a first end 122 and a second end 124 opposite the first end 122. The coupler housing 130 includes a first wall 142 and a second wall 144 opposite the first wall 142. The first wall 142 and the second wall 144 are in a facing space relationship defining a cavity 146 therebetween. The first wall 142 and the second wall 144 extend perpendicularly away from a base arm 131 of coupler housing 130. The base arm 131 includes an upper surface 133 and a lower surface 135 opposite the upper surface 133. An upper surface 133 of the base arm 131 forms a third or bottom wall of the cavity 146 along with the first wall 142 and the second wall 144, as shown in FIG. 2. The upper surface 133, the first wall 142, and the second wall 144 at least partially enclosing the cavity 146 therebetween.

The first wall 142 of the coupler housing 130 includes a first slot 148 extending about parallel to the base arm 131 and the second wall 144 of the coupler housing 130 includes a second slot 149 extending about parallel to the base arm 131. The lock release pivot arm 120 includes an orifice 162 proximate the second end 124 of the lock release pivot arm 120. In an embodiment, the second end 124 of the lock release pivot arm 120 is located within the cavity 146. A pivot pin 160 is located through the orifice 162, the first slot 148, and the second slot 149. The pivot pin 160 operably connects the lock release pivot arm 120, the first slot 148, and the second slot 149. The pivot pin 160 may slide through the first slot 148 and the second slot 149, such that the slots 148, 149 act as a guide for the pivot pin 160 to move through.

Figure 4:
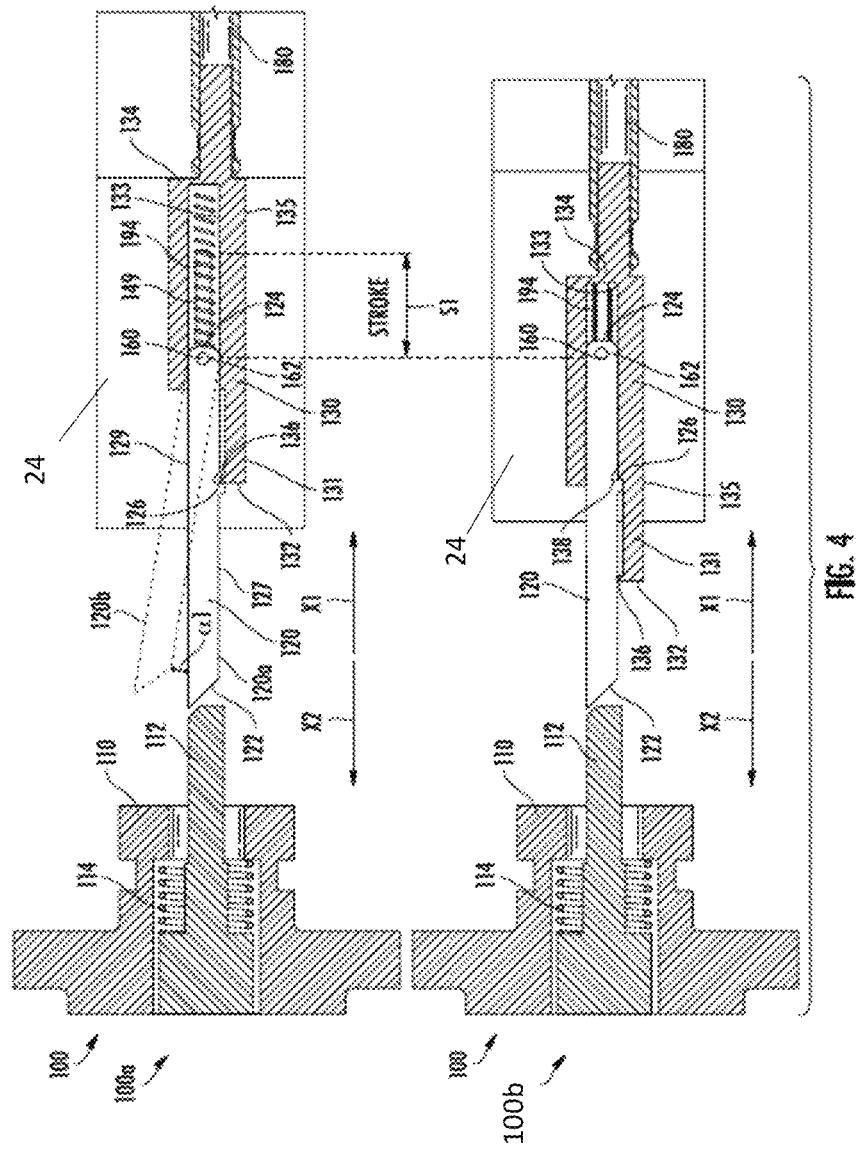
FIG. 4 is a cross-sectional side view of a latch mechanism in a locked position and an unlocked position, according to an embodiment of the present disclosure.
Figure 5:
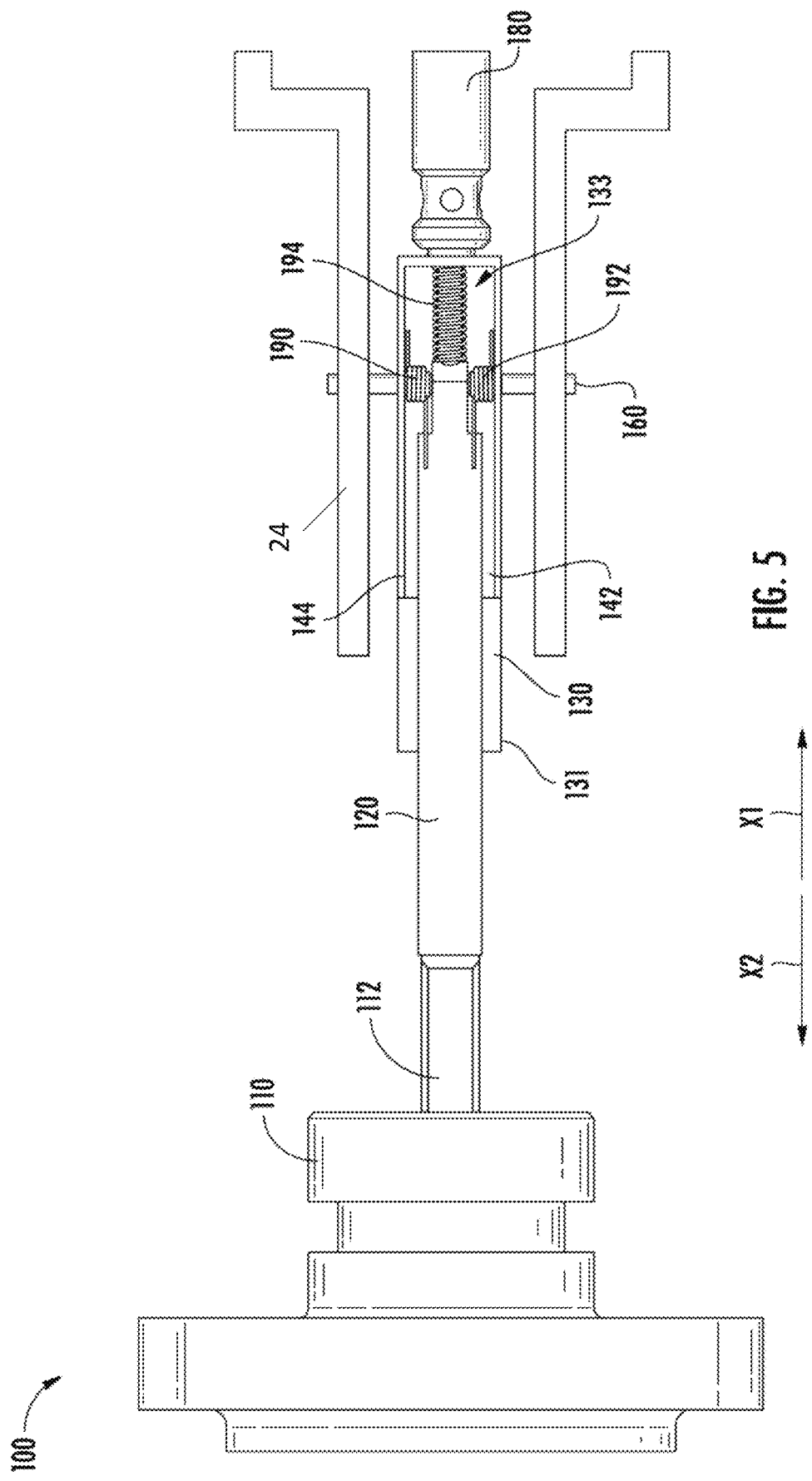
FIG. 5 is a top view of a latch mechanism, according to an embodiment of the present disclosure

The lock release pivot arm 120 may then rotate around the pivot pin 160 through an angle of rotation α1 from a neutral position 120a to a raised rotated position 120b, a shown in FIG. 4. In the neutral position the lock release pivot arm 120 is about parallel to the base arm 131, as shown in FIG. 4. A rotational biasing mechanism 190, as shown in FIG. 5, is operably connected to the coupler housing 130 and the lock release pivot arm 120 to maintain the lock release pivot arm 120 in the neutral position 120a until the lock release pivot arm 120 is impacted by the solenoid 110, discussed further below. The rotational biasing mechanism 190 may be a rotational spring, as shown in FIG. 5. The rotational biasing mechanism 190 may be operably connected to the coupler housing 130 and the lock release pivot arm 120 proximate the pivot pin 160. In the neutral position 120a the lock release pivot arm 120 is about parallel to the base arm 131 of the coupler housing 130.

The solenoid 110 is configured to move the solenoid plunger 112 in a first direction X1 when the solenoid 110 is activated and the solenoid reset spring 114 is configured to move the solenoid plunger 112 in a second direction X2 opposite the first direction X1 when solenoid 110 is deactivated. As the solenoid plunger 112 moves in the first direction X1 the plunger 112 impacts the first end 122 of the lock release pivot arm 120. As shown in FIGS. 2-4, the first end 122 of the lock release pivot arm 120 may be wedge shaped to drive the lock release pivot arm 120 up and over the solenoid plunger 112, thus rotating the solenoid plunger 112 around the pivot pin 160 from the neutral position 121a to the raised rotated position 120b when the solenoid 110 is activated.

In the neutral position 120a, a first notch 136 of the coupler housing 130 may be interlocked with a first notch 126 of the lock release pivot arm 120. The first notch 126 of the lock release pivot arm 120 may be located on a bottom surface 127 of the lock release pivot arm 120. The bottom surface 127 is located opposite a top surface 129 of the lock release pivot arm 120. The bottom surface 127 is in a facing spaced relationship with the upper surface 133 of the coupler housing 130. The first notch 136 of the coupler housing 130 may be located on an upper surface 133 of the base arm 131 of the coupler housing 130, as shown in FIG. 4. The first notch 136 of the coupler housing 130 may also be located at a first end 132 of the coupler housing 130, as shown in FIG. 4.

As the solenoid plunger 112 moves in the first direction X1 the plunger 112 impacts the first end 122 of the lock release pivot arm 120 and the lock release pivot arm 120 is rotated from the neutral position 120a to the raised rotated position 120b. In the raised rotated position, the first notch 136 of the coupler housing 130 is disengaged from the first notch 126 of the lock release pivot arm 120. A lock bolt biasing mechanism attached to the lock bolt 180 pushes the coupler housing 130 in the second direction X2.

A linear biasing mechanism 194 pushes the lock release pivot arm 120 and the coupler housing 130 away from each other to the locked position (FIG. 2 and FIG. 4 at 100a). In an embodiment, the linear biasing mechanism 194 may be a tensile spring. The linear biasing mechanism 194 is attached to the second end 124 of the lock release pivot arm 120 and the second end 134 of the coupler housing 134. In an embodiment, the linear biasing mechanism 194 is oriented about parallel to the first slot 148 and the second slot 149. In another embodiment, the linear biasing mechanism 194 is located within the cavity 146.

As the linear biasing mechanism 194 pulls the lock release pivot arm 120 and the coupler housing 130 together to the unlocked position (FIG. 3 and FIG. 4 at 100b), the pivot pin 160 will slide through the first slot 148 and the second slot 149 through a stroke distance Si. Once the pivot pin 160 and the lock release pivot arm 120 has slid through the stroke distance Si, the first notch 126 on the bottom surface 126 of the lock release pivot arm 120 engages with a second notch 138 of the coupler housing 130, thus maintaining the release latch mechanism 100 in the unlocked position (FIG. 3 and FIG. 4 at 100b). The second notch 138 of the coupler housing 130 may be located on the upper surface 133 of the base arm 131 of the coupler housing 130, as shown in FIG. 4. The first notch 136 of the coupler housing 130 may also be located at a point on the upper surface 133 interposed between first end 132 of the coupler housing 130 and the second end 134 of the coupler housing 130, as shown in FIG. 4.

Retraction of the actuator 24 initiates with the solenoid 110 being deactivated. Hydraulic pressure causes the backward movement of the lock bolt 180 in the first direction X1, which moves the coupler housing 130 back to the locked position (FIG. 2, and FIG. 4 at 100a) because of force from the biasing mechanism 194 in the first direction X1.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A release mechanism for use in moving in a ram air turbine from a stowed position to a deployed position, the release mechanism comprising:
    an extender member operatively connected to the ram air turbine;
    a coupler housing extending from a first end to a second end opposite the first end, the coupler housing coupled to the extender member, the coupler housing comprising:
        a base arm having an upper surface and a lower surface opposite the upper surface;
        a first wall extending away from the upper surface of the base arm, the first wall including a first slot; and
        a second wall extending away from the upper surface of the base arm, the second wall including a second slot, wherein the upper surface, the first wall, and the second wall at least partially enclose a cavity therebetween;
    a release pivot arm comprising:
        a first end;
        a second end opposite the first end of the release pivot arm; and
        has been amended as—an orifice located proximate the second end of the release pivot arm;
    a pivot pin located within the first slot, the second slot, and the orifice, the pivot pin operably connecting the release pivot arm and the coupler housing; and
    a solenoid having a solenoid plunger, wherein, when the solenoid is activated, the solenoid plunger is configured to impact the first end of the release pivot arm, allowing the release pivot arm to move form a first position toward a second position, moving the coupler housing to a position where the extender member moves the ram air turbine to the stowed position; and wherein, when the solenoid is deactivated, the solenoid plunger is resettled, allowing coupler housing to move to another position wherein the extender member move the ram air turbine to the extended position.

2. The release mechanism of claim 1, further comprising:
a rotational biasing mechanism operably connected to the coupler housing and the release pivot arm, wherein the rotational biasing mechanism maintains the release pivot arm in a neutral position.

3. The release mechanism of claim 2, wherein the rotational biasing mechanism operably connects to the coupler housing and the release pivot arm proximate the pivot pin.

4. The release mechanism of claim 2, wherein in the neutral position the release pivot arm is about parallel to the coupler housing.

5. The release mechanism of claim 1, further comprising:
a linear biasing mechanism operably connected to the second end of the release pivot arm and to the second end of the coupler housing.

6. The release mechanism of claim 5, wherein the linear biasing mechanism is oriented about parallel with the first slot and the second slot.

7. The release mechanism of claim 5, wherein the linear biasing mechanism is located within the cavity.

8. The release mechanism of claim 1, wherein the second end of the release pivot arm is located within the cavity.

9. The release mechanism of claim 1, wherein the first end of the release pivot arm is wedge shaped.

10. The release mechanism of claim 1, wherein the release pivot arm further comprises a first notch located on a bottom surface of the release pivot arm, the bottom surface being in a facing spaced relationship with the upper surface of the coupler housing, wherein the first notch is configured to interlock with the base arm of the coupler housing at a first point and a second point.

11. The release mechanism of claim 1, wherein the base arm of the coupler housing further comprises:
a first notch located in the upper surface of the base arm, the first notch being configured to interlock with lock release arm at a first point on a bottom surface of the release pivot release arm; and
a second notch located in the upper surface of the base arm, the second notch being configured to interlock with the release arm at the first point on the bottom surface of the release pivot arm.

12. The release mechanism of claim 1, wherein the release pivot arm further comprises a first notch located on a bottom surface of the release pivot arm, the bottom surface being in a facing spaced relationship with the upper surface of the coupler housing, and wherein the base arm of the coupler housing further comprises: a first notch located in the upper surface of the base arm and configured to interlock with the first notch of the lock release arm; and a second notch located in the upper surface of the base arm and configured to interlock with the first notch of the lock release arm.

13. The release mechanism of claim 12, wherein the first notch of the base arm is located at the first end of the base coupler housing.

14. The release mechanism of claim 13, wherein the second notch of the base arm is located interposed between the first end of the base coupler housing and the second end of the base coupler housing.

* * * * *